United States Patent
Marte

(10) Patent No.: US 10,260,775 B2
(45) Date of Patent: Apr. 16, 2019

(54) RETROFIT HOT WATER SYSTEM AND METHOD

(71) Applicant: Energy Recovery Systems Inc., Coquitlam (CA)

(72) Inventor: Sean Douglas Marte, Langley (CA)

(73) Assignee: GREEN MATTERS TECHNOLOGIES INC., Vancouver, BC (CA)

( * ) Notice: Subject to any disclaimer, the term of this patent is extended or adjusted under 35 U.S.C. 154(b) by 1252 days.

(21) Appl. No.: 13/838,633

(22) Filed: Mar. 15, 2013

(65) Prior Publication Data

US 2014/0263682 A1     Sep. 18, 2014

(51) Int. Cl.
  *F24H 4/04* (2006.01)
  *F24D 17/00* (2006.01)
  *F24D 17/02* (2006.01)
  *F24D 19/10* (2006.01)

(52) U.S. Cl.
  CPC ............. *F24H 4/04* (2013.01); *F24D 17/001* (2013.01); *F24D 17/02* (2013.01); *F24D 19/1054* (2013.01); *F24D 2200/123* (2013.01); *F24D 2200/16* (2013.01); *Y02B 10/70* (2013.01); *Y02B 30/18* (2013.01); *Y02B 30/52* (2013.01)

(58) Field of Classification Search
  CPC .... F24D 17/001; F24D 17/02; F24D 19/1054; F24D 2200/123
  See application file for complete search history.

(56) References Cited

U.S. PATENT DOCUMENTS

| | | | | |
|---|---|---|---|---|
| 3,922,876 A | * | 12/1975 | Wetherington, Jr. | ... F25B 40/04 62/177 |
| 4,141,222 A | | 2/1979 | Richie | |
| 4,226,606 A | * | 10/1980 | Yaeger | .................... F24D 17/02 62/238.6 |
| 4,265,094 A | | 5/1981 | Haasis, Jr. | |
| 4,293,093 A | * | 10/1981 | Raymond | ........... F24D 11/0235 126/362.1 |
| 4,320,630 A | | 3/1982 | Uselton et al. | |
| 4,330,309 A | | 5/1982 | Robinson, Jr. | |
| 4,416,222 A | | 11/1983 | Staats | |

(Continued)

FOREIGN PATENT DOCUMENTS

| | | |
|---|---|---|
| CA | 2229355 C | 2/1999 |
| CA | 2574996 A1 | 12/2006 |

(Continued)

OTHER PUBLICATIONS

Carlyle Compressor—Smart Unloading Controller Application Guide; Dec. 22, 2011.

(Continued)

*Primary Examiner* — Kenneth Rinehart
*Assistant Examiner* — Deepak A Deean
(74) *Attorney, Agent, or Firm* — Perry + Currier, Inc.

(57) ABSTRACT

A hot water system and method are provided. The system includes a tank configured to receive hot water, a heat recovery system for heating water, and a controller configured to use the heat recovery system to maintain the hot water in the tank at a temperature within a predetermined range of temperatures. The method involves receiving a flow of water and heating the water using the hot water system.

12 Claims, 11 Drawing Sheets

(56) References Cited

U.S. PATENT DOCUMENTS

| | | | |
|---|---|---|---|
| 4,431,390 A | 2/1984 | Hart | |
| 4,558,818 A * | 12/1985 | Harnish | F24D 19/1054 236/25 R |
| 4,680,941 A * | 7/1987 | Richardson | F24D 17/02 62/184 |
| 4,685,307 A | 8/1987 | Jones | |
| 4,972,683 A | 11/1990 | Beatenbough | |
| 5,050,394 A * | 9/1991 | Dudley | F24D 17/02 62/115 |
| 5,115,644 A | 5/1992 | Alsenz | |
| 5,305,614 A | 4/1994 | Gilles | |
| 5,351,502 A * | 10/1994 | Gilles | F24F 5/0096 62/238.7 |
| 5,360,057 A * | 11/1994 | Rockenfeller | F25B 17/083 165/104.12 |
| 5,367,602 A * | 11/1994 | Stewart | F24D 19/1054 237/2 B |
| 5,429,179 A * | 7/1995 | Klausing | F02B 43/00 165/240 |
| 5,575,159 A | 11/1996 | Dittell | |
| 5,598,721 A * | 2/1997 | Rockenfeller | C09K 5/00 62/480 |
| 5,622,057 A | 4/1997 | Bussjager et al. | |
| 5,758,820 A | 6/1998 | Celorier, Jr. et al. | |
| 5,806,331 A | 9/1998 | Brown | |
| 5,906,104 A | 5/1999 | Schwartz et al. | |
| 5,984,198 A * | 11/1999 | Bennett | F24F 5/0096 165/140 |
| 6,381,970 B1 | 5/2002 | Eber et al. | |
| 6,711,911 B1 | 3/2004 | Grabon et al. | |
| 6,837,443 B2 * | 1/2005 | Saitoh | F24D 17/02 237/2 B |
| 7,334,419 B2 | 2/2008 | Gordon et al. | |
| 7,614,295 B2 * | 11/2009 | Niikawa | G01F 1/00 73/202.5 |
| 7,614,367 B1 * | 11/2009 | Frick | F22B 27/04 122/26 |
| 7,644,591 B2 | 1/2010 | Singh et al. | |
| 7,845,179 B2 | 12/2010 | Singh et al. | |
| 7,908,881 B2 | 3/2011 | Kopko | |
| 8,250,879 B2 | 8/2012 | MacBain et al. | |
| 9,134,037 B2 * | 9/2015 | Le Mer | F24D 17/0031 |
| 9,217,574 B2 * | 12/2015 | Kim | F24D 11/0214 |
| 2001/0039809 A1 | 11/2001 | Wada et al. | |
| 2003/0077179 A1 | 4/2003 | Collins et al. | |
| 2008/0196871 A1 | 8/2008 | Lavanchy et al. | |
| 2008/0296396 A1 | 12/2008 | Corroy et al. | |
| 2009/0113911 A1 * | 5/2009 | Nakayama | F24D 17/02 62/238.6 |
| 2009/0232663 A1 | 9/2009 | Mirsky et al. | |
| 2010/0018228 A1 * | 1/2010 | Flammang | F25B 27/02 62/115 |
| 2010/0089339 A1 * | 4/2010 | Krause | F24D 17/0078 122/19.1 |
| 2010/0193152 A1 | 8/2010 | Singleton, Jr. et al. | |
| 2011/0132007 A1 | 6/2011 | Weyna et al. | |
| 2011/0209485 A1 | 9/2011 | Lifson et al. | |
| 2012/0024493 A1 * | 2/2012 | Milthers | F24D 19/1051 165/11.1 |
| 2012/0255320 A1 | 10/2012 | Kawagoe et al. | |
| 2014/0026483 A1 * | 1/2014 | Mishra | F01K 23/068 48/89 |

FOREIGN PATENT DOCUMENTS

| | | |
|---|---|---|
| CN | 101240949 A | 8/2008 |
| EP | 1801515 A1 | 6/2007 |
| GB | 2052712 A | 1/1981 |
| JP | 8233408 A | 9/1996 |
| JP | 2011058649 A | 3/2011 |
| WO | 2004051148 A1 | 6/2004 |
| WO | 2011127553 A1 | 10/2011 |
| WO | 2011127571 A1 | 10/2011 |
| WO | 2012135933 A2 | 10/2012 |

OTHER PUBLICATIONS

Frick Quantum LX Compressor Control Panel Version 7.0x; Operation (Session Level 2); Service Manual Jun. 2011.

McQuay AirConditioning; Centrifugal Compressor Water Chillers Catalog; CAT WSCWDC-7; Jan. 2009.

PCT International Application No. PCT/CA2010/000605 Search Report dated Jan. 19, 2011.

PCT International Application No. PCT/CA2010/000605 Written Opinion dated Jan. 19, 2011.

PCT International Application No. PCT/CA2010/000605 International Preliminary Report on Patentability dated Sep. 21, 2012.

PCT International Application No. PCT/CA2011/000403 International Search Report dated Jul. 13, 2011.

PCT International Application No. PCT/CA2011/000403 Written Opinion dated Jul. 13, 2011.

PCT International Application No. PCT/CA2011/000403 International Preliminary Report on Patentability dated Sep. 21, 2012.

PCT International Application No. PCT/CA2011/000406 International Search Report dated Dec. 13, 2011.

PCT International Application No. PCT/CA2011/000406 Written Opinion dated Dec. 13, 2011.

PCT International Application No. PCT/CA2011/000406 Second Written Opinion dated May 8, 2013.

* cited by examiner

RETROFIT HOT WATER SYSTEM AND METHOD

FIELD

The present invention relates generally to energy exchange and distribution systems including heating, ventilation, air-conditioning and water heating, and more particularly relates to hot water systems which can be retrofitted into an existing water heating system.

BACKGROUND

It is known to employ energy exchange technologies in order to, for example, recover excess heat energy from an air-conditioning system to provide energy to heat water. Many examples of such heat-exchange technologies came about in the early 1980s which reflect the end of the energy crises of the 1970s. It is interesting to note that these heat-exchange technologies have not been generally adopted.

SUMMARY

In accordance with an aspect of the invention, there is provided a hot water system. The hot water system includes a tank configured to receive hot water. The tank is further configured to store the hot water. In addition, the tank is configured to deliver a hot water flow upon demand. The hot water system also includes a heat recovery system in fluid communication with the tank and a source of cold water. The heat recovery system is configured to receive cold water from the source and heat the cold water to provide the hot water to the tank. The heat recovery system is further configured to heat a portion of the hot water. Furthermore, the hot water system includes a controller configured to use the heat recovery system to transfer additional heat to the portion of the hot water for maintaining the hot water in the tank at a temperature within a predetermined range of temperatures.

The hot water system may include a tank sensor for measuring a temperature of the hot water in the tank.

The controller may be configured to monitor the temperature of the hot water using the tank sensor and is further configured to heat the hot water when the temperature of the hot water falls below the predetermined range of temperatures.

The controller may be configured to power on and to power down the heat recovery system depending on a demand for hot water in the tank.

The hot water system may further include a boiler for heating the hot water in the tank.

The hot water system may further include a pump for pumping a water flow to the heat recovery system.

The pump may be configured to draw the water flow from at least one of the source and the tank.

The pump may draw all of the cold water from the source.

The heat recovery system may be a heat pump. The heat pump may be configure to transfer waste heat from an external heat source using a refrigerant.

The heat recovery system may further include a condenser configured to receive a water flow. The condenser may be configured to transfer the additional heat to the water flow at a first heat transfer rate by condensing the refrigerant. The heat recovery system may also include an evaporator configured to receive the waste heat by evaporating the refrigerant. In addition the heat recovery system may include a compressor for compressing the refrigerant.

The heat recovery system may further include a subcooler configured to transfer more heat to the water flow at a second heat transfer rate by thermal conduction between the refrigerant and the water flow.

The hot water system may further include a waste heat connector. The waste heat connector may be for connecting to the external heat source.

The waste heat connector may be configured to connect to an existing chiller system.

In accordance with another aspect of the invention, there is provided a method of operating a hot water system. The method involves receiving cold water from a source. The method further involves heating the cold water into hot water using a heat recovery system. The method also involves storing the hot water in a tank. Furthermore, the method involves transferring additional heat to a portion of the hot water for maintaining the hot water in the tank at a temperature within a predetermined range of temperatures.

The method may further involve measuring a temperature of the hot water in the tank with a tank sensor.

Transferring additional heat may involve transferring additional heat when the temperature of the hot water falls below the predetermined range of temperatures.

Heating the cold water may involve transferring waste heat from an external heat source to the water using a refrigerant.

The method may further involve pumping a water flow from at least one of the source and the tank.

Pumping a water flow pump may draw all of the cold water from the source.

BRIEF DESCRIPTION OF THE DRAWINGS

Reference will now be made, by way of example only, to the accompanying drawings in which.

DETAILED DESCRIPTION OF THE EMBODIMENTS

Figure 1:
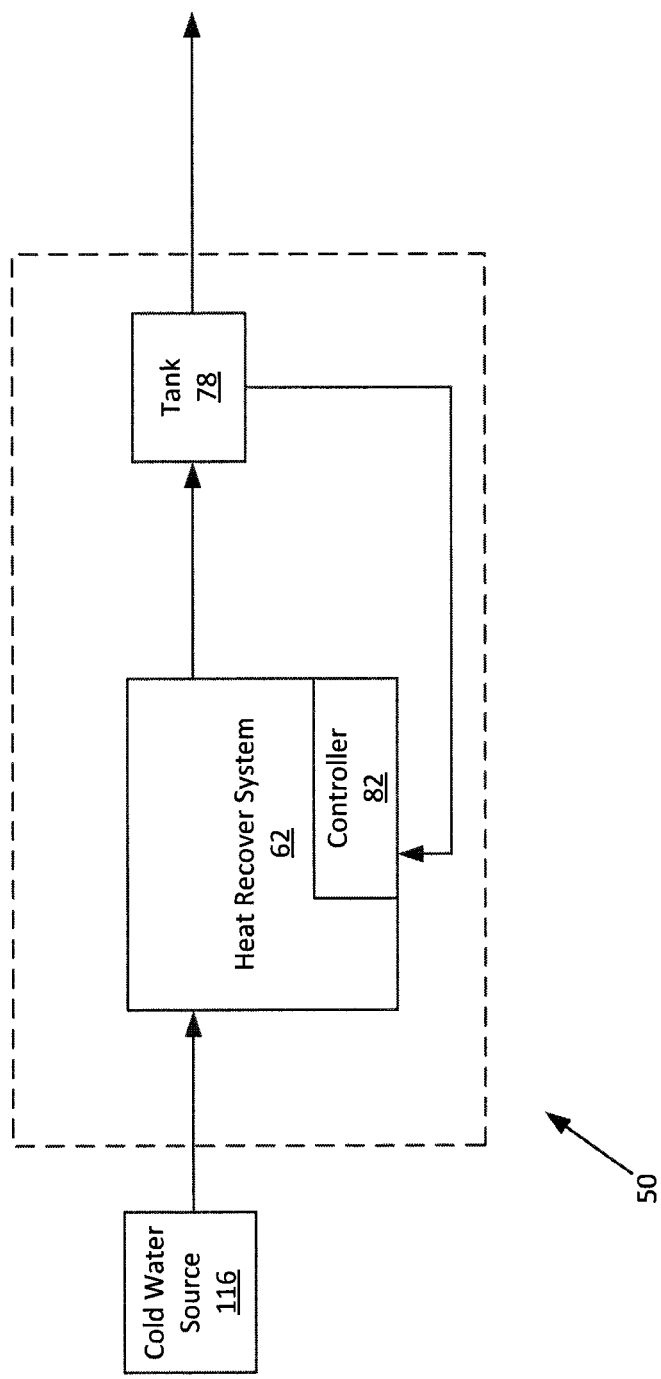
FIG. 1 is a schematic representation of an exemplary hot water system in accordance with an embodiment.

Referring now to FIG. 1, a schematic representation of a hot water system for heating water from a source is shown generally at 50. It is to be understood that the hot water system 50 is purely exemplary and that it will be apparent to those skilled in the art that a variety of hot water systems are contemplated. The hot water system 50 includes a tank 78, a heat recovery system 62, and a controller 82.

In the present embodiment, the tank 78 is generally configured to receive hot water from the heat recovery system 62. The tank 78 is further configured to store the hot water for future use. For example, in the present embodiment, the hot water is stored in the tank 78 for delivering a hot water flow. The hot water flow can be used for providing hot water to a building on demand such as through a faucet controlled by a user. Alternatively, the hot water flow can be used to provide space heating such as through a radiator. It is to be appreciated that the tank 78 is not particularly limited to any structure and that a wide variety of tanks for storing water can be used. For example, the tank 78 can be constructed of any type of materials capable of holding water. Some suitable materials include plastics, steel, and aluminum. Although a material with a low thermal conductivity can be used to retain the heat in the hot water, other materials can be used to reduce costs of manufacturing, especially when the heat recovery system 62 can maintain the temperature of the hot water in the tank 78 using waste energy.

In general terms, the heat recovery system 62 is in fluid communication with the tank 78 and a source 116 of cold water. The manner by which fluid communication is provided is not particularly limited. In the present embodiment, piping typically used in residential and commercial plumbing applications for a building are used to established fluid communication between the various components of the hot water system 50. In other embodiments, other types of piping such as high pressure piping can be used. The heat recovery system 62 is further configured to receive cold water from the source 116. The heat recovery system 62 transfers waste heat from an external waste heat source to the cold water from the source 116 to heat the cold water into hot water. The manner by which the water is heated is not particularly limited and will be discussed in greater detail below.

The heat recovery system 62 is further configured to receive a portion of the hot water stored in the tank 78 and to add heat to the portion of the hot water received. The manner by which the water is heated is not particularly limited and can include similar methods used for heating the cold water. For example, the input to the heat recovery system 62 can be configured to receive a combined flow including both the portion of the hot water from the tank 78 and the cold water from the source 116. In particular, the portion of the hot water from the tank 78 and the cold water from the source 116 can be configured to feed into the heat recovery system 62 after being combined using a tee fitted. Alternatively, the portion of the hot water and the cold water from the source 116 can be heated separately by the heat recovery system 62 using different heating mechanisms. In particular, the heat recovery system 62 can include two heat pump circuits for independently heating the portion of the hot water from the tank 78 and the cold water from the source 116 and ultimately combining the heated water.

Figure 2:
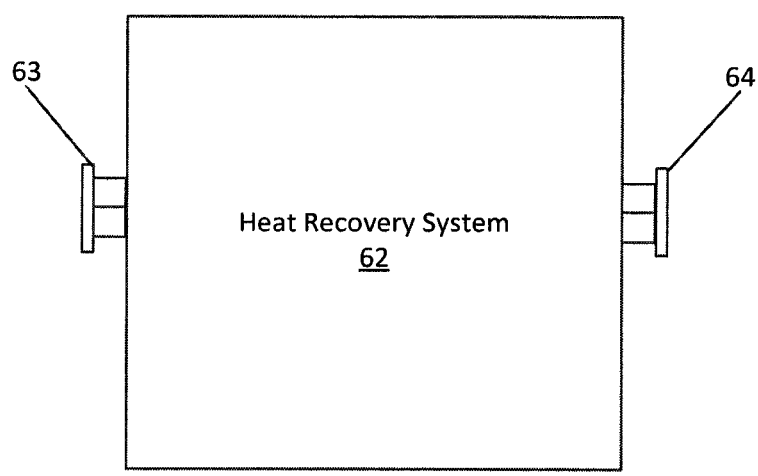
FIG. 2 is a schematic representation of a heat recovery system in accordance with an embodiment.

Referring to FIG. 2, a representation of the heat recovery system 62 can include a waste heat connector 63 for connecting to a source of waste heat, such as a chiller system (not shown) and a water connector 64 for connecting the heat recovery system 62 to the source 116 of cold water and the tank 78. The waste heat connector 63 is generally configured to receive waste heat. For example, the waste heat can be received using a medium such as a liquid, forced air or thermal conduction through a material. It is to be appreciated that by providing the waste heat connector 63 and the water connector 64, the heat recovery system 62 can be simply incorporated in a wide variety of buildings without the need for significant modifications to the existing plumbing to implement the hot water system 50.

It is to be re-emphasized that the embodiment shown in FIG. 2 is purely exemplary and that variations are contemplated For example, it is to be appreciated that the chiller connector 63 and the water connector 64 are optional and can be omitted in some embodiments of the heat recovery system 62. As another example of a variation, although the waste heat connector 63 has an inlet and an outlet for a medium, such as a liquid, carrying the waste heat and the water connector 64 has an inlet and an outlet for the cold water and the hot water, respectively, the waste heat connector 63 and the water connector 64 can be a plurality of connectors where the inlet and the outlet are provided using separate connectors in other embodiments.

It is to be appreciated, with the benefit of this description, that the hot water system 50 is generally configured to operate along with a source of waste heat, such as the exhaust of a chiller system. In general, the system producing the waste heat can operate independently from the system for providing hot water within a building, such as a chiller operating independently from a boiler. However, by independently operating the chiller and the boiler, power is supplied to each of the chiller and the boiler independently, usually in the form of electricity for the chiller system 54 and usually in the form of burning a fossil fuel such as natural gas or diesel for the hot water system 58. By transferring some of the waste heat generated to the hot water system 50, it is to be appreciated, that the overall amount of energy required to heat the water is reduced. Accordingly, the heat recovery system 62 can be installed in a building having existing systems with low costs to implement the hot water system 50 since the existing equipment in a building does not need to be replaced. Furthermore, since the existing equipment is not replaced, reverting to the original configuration for heating water would be simple, such as during a failure of the heat recovery system 62 or during a scheduled maintenance requiring the heat recovery system 62 to be offline.

Figure 3:
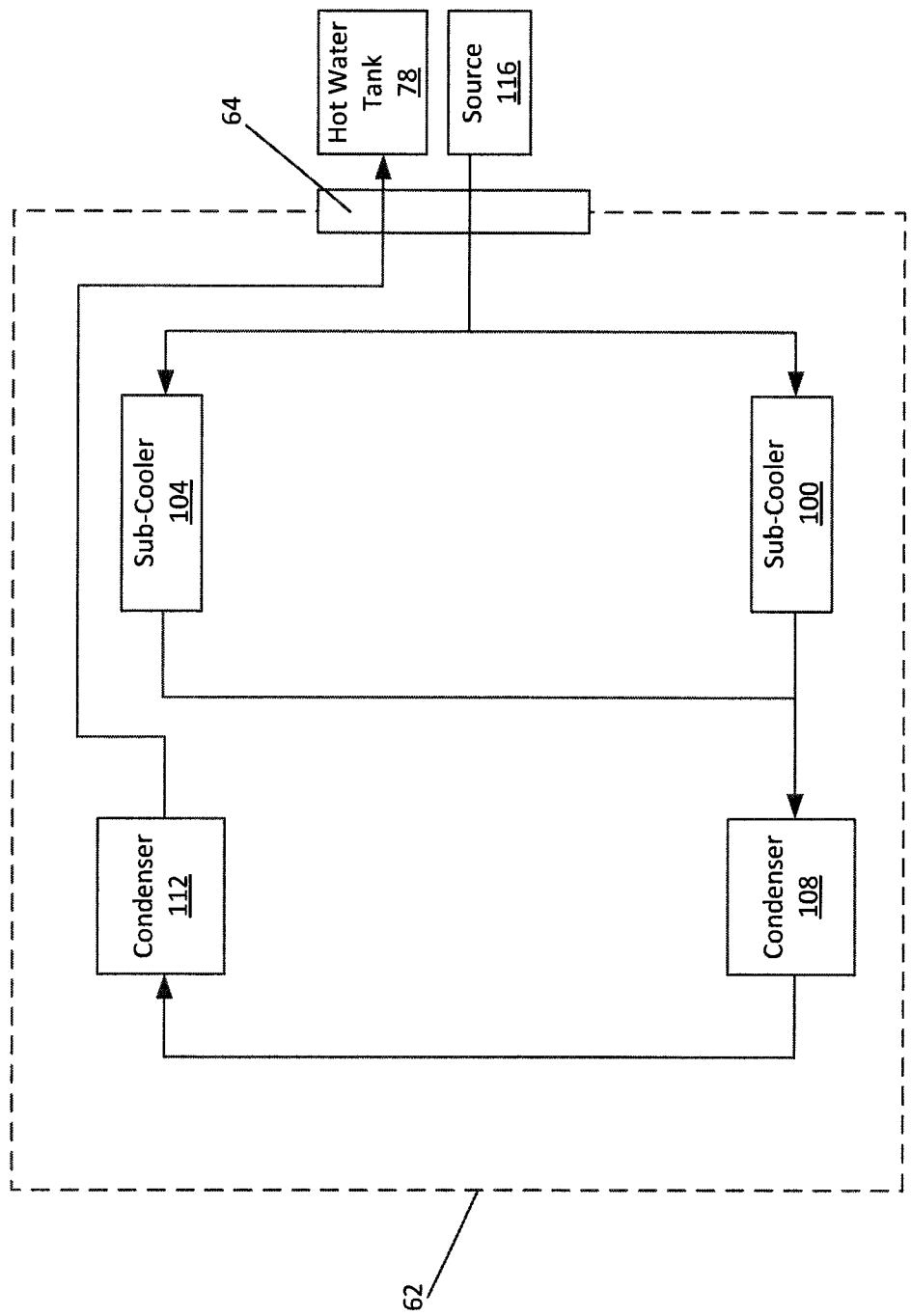
FIG. 3 is a schematic representation of water flow through the heat recovery system of the embodiment shown in FIG. 2.

Referring to FIG. 3, a schematic representation showing the flow of water through an embodiment of the heat recovery system 62 is shown in greater detail. In particular, FIG. 3 illustrates the flow of water through the heat recovery system 62. It is to be understood that the heat recovery system 62 is purely exemplary and it will be apparent to those skilled in the art that a variety of heat recovery systems are contemplated including other embodiments discussed in greater detail below. The heat recovery system 62 includes a first subcooler 100, a second subcooler 104, a first condenser 108, and a second condenser 112.

In general, the heat recovery system 62 is configured to receive water from a water source 116 and add waste heat from another system, such as a chiller system, to the water for increasing the temperature of the water. The water source 116 is not particularly limited. For example, the water source 116 can include a municipal water source. In other embodiments, the water source 116 can be a well or water tower. In some embodiments, the heated water can be provided to a boiler for further supplemental heat energy if the heat exchange system 62 cannot provide sufficient temperature or heat energy to the water at the rate required due to a demand for hot water. Alternatively, the heat recovery system 62 can be connected between the tank 78 and the boiler such that prior to receiving the water from the water source 116, the water can pass through the boiler 74 to receive supplemental heat energy if required. In another alternative, a boiler can be connected independently to the tank 78 for supplemental heating. Upon entering the heat recovery system 62, the water is generally passed through the first subcooler 100, the second subcooler 104, the first condenser 108, and the second condenser 112, where heat energy is added to the water. The manner by which waste heat from the chiller system 54 is added to the water is not particularly limited. In the present embodiment, the first and second condensers 108, 112 condense a gaseous refrigerant into a liquid. The heat energy released by the phase change is transferred to the water by thermal conduction. The first and second subcoolers 100, 104 transfer heat energy from the liquid refrigerant to the water by thermal conduction since the liquid refrigerant is configured to be at a higher temperature than the incoming water. After the water has been heated, the heat recovery system 62 delivers the hot water to the tank 78.

Figure 4:
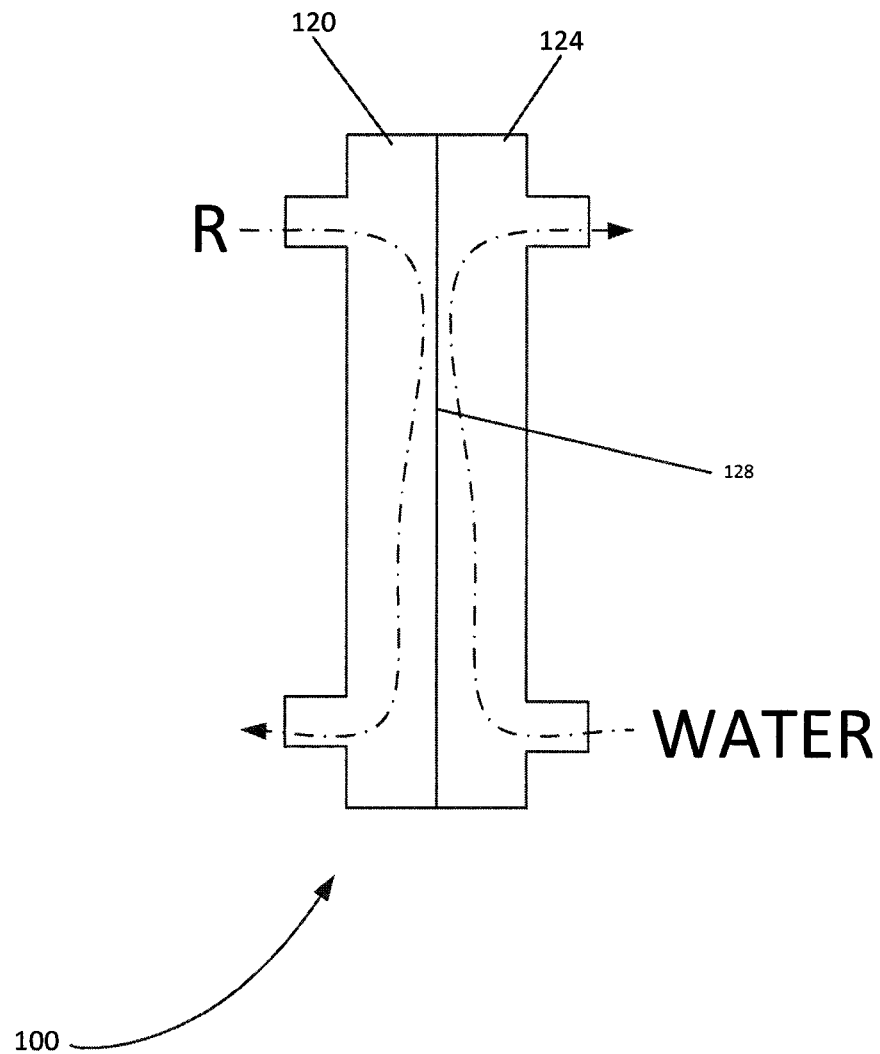
FIG. 4 is a schematic representation a subcooler in accordance with an embodiment.

In the present embodiment, the first subcooler 100 is configured to receive at least a portion of the water from the water source 116. In particular, the first subcooler 100 is configured to receive a flow of water therethrough. The manner by which the water from the water source 116 is divided to provide the first subcooler 100 with a portion is not particularly limited. For example, in the present embodiment, a tee connector can be used to divide the flow of water from the water source 116 into approximately equal portions. The first subcooler 100 is further configured to transfer heat to the portion of the water received. The manner by which heat energy is transferred is not particularly limited. For example, in the present embodiment, the first subcooler 100 can include a first compartment 120 through which refrigerant flows and a second compartment 124 through which water flows as shown in FIG. 4. It is to be appreciated, with the benefit of this description, that the temperature of the refrigerant is greater than the temperature of the water for water heating purposes. Accordingly, as the water and refrigerant are in thermal communication, the water will receive heat energy from the refrigerant and increase in temperature whereas the refrigerant will give off heat energy and subcool.

The two compartments 120, 124 are separated by a wall 128 configured to transfer heat from the first compartment 120 to the second compartment 124. The rate at which heat energy is transferred is not particularly limited and can depend on several factors such as the material, size and geometry of the wall 128, as well as the relative temperatures of the two compartments 120, 124. The wall 128 is constructed from materials which can separate the two compartments while providing high thermal conductivity. Some examples of suitable materials include copper, stainless steel, aluminum, and other materials of high thermal conductivity. The exact configuration of the two compartments 120, 124 is not particularly limited. In the present embodiment, the two compartments 120, 124 are configured such that the refrigerant and the water flow in opposite directions. In other embodiments, the configuration of two compartments 120, 124 can be arranged such that the refrigerant and the water flow in the same direction. In further embodiments, more compartments can be added to form alternating layers of refrigerant flow and water flow. The two compartments 120, 124 can also be configured to follow a tortuous route and may be provided with internal fins or other protrusions to increase heat transfer efficiency.

It is to be re-emphasized that the structure shown in FIG. 4 is a schematic, non-limiting representation only and that variations are contemplated. Since the oil in the refrigerant can be considered a toxin and the water flowing through the first subcooler 100 from the hot water system 58 contains potable water, additional features can be added to ensure the separation to the first compartment 120 and the second compartment 124. For example, in other embodiments, the first subcooler 100 can include a double walled and an air gap such that a leak in one of the walls will allow water or refrigerant to leak to atmosphere but contamination of the potable water is prevented. As another example, further embodiments can include an additional heat transfer mechanism (not shown) can be installed between the hot water system 58 and the heat recovery system 62 to transfer the waste heat recovered by the heat recovery system 62 such that the additional heat transfer mechanism acts as an barrier to prevent contamination of the potable water.

Referring again to FIG. 3, the second subcooler 104 is configured to receive at least a portion of the water from the water source 116 similar to the first subcooler 100. In particular, the first subcooler 100 is configured to receive a flow of water therethrough. The second subcooler is further configured to transfer heat energy to the portion of the water received similar to the first subcooler 100. It is to be appreciated that the second subcooler 104 is not particularly limited and can be similar or identical to the first subcooler 100. It is to be re-emphasized that the present embodiment is a non-limiting embodiment and that the first subcooler 100 and the second subcooler 104 can be different from described. For example, the first subcooler 100 and the second subcooler 104 can be of different sizes, from different manufacturers, of a different type.

It is to be appreciated, with the benefit of this description, that the water from the water source 116 flows into each of the first subcooler 100 and the second subcooler 104 in parallel. In the present embodiment, approximately half of the water from the water source 116 flows into each of the first subcooler 100 and the second subcooler 104. However, in other embodiments, the flow can be configured such that the amount of water flowing into the first subcooler 100 is more or less than the amount of water flowing into the second subcooler 104. For example, in situations where the first subcooler 100 and the second subcooler 104 are each configured to transfer heat energy at a different rate, the amount of water flowing into each of the first subcooler 100 and the second subcooler 104 can be adjusted such that the temperature of the water leaving each of the first subcooler 100 and the second subcooler 104 is similar. However, in the present embodiment, the water from each of the first subcooler 100 and the second subcooler 104 is combined after the water passes through the subcoolers 100, 104 and natural fluid mixing averages the temperature of the combined water flow. The manner by which the water from the subcoolers 100, 104 is combined is not particularly limited. For example, in the present embodiment, a tee connector can be used receive the portions of water from each of the subcoolers 100, 104 to combine at a single outlet.

The first condenser 108 is in fluid communication with both the first subcooler 100 and the second subcooler 104. The first condenser 108 configured to receive the portion of water passing through the first subcooler 100 and the portion of water passing through the second subcooler 104. In particular, the first condenser 108 is configured to receive a combined water flow therethrough. The manner by which the first condenser receives the water from the first subcooler 100 and the second subcooler 104 is not particular limited.

Figure 5:
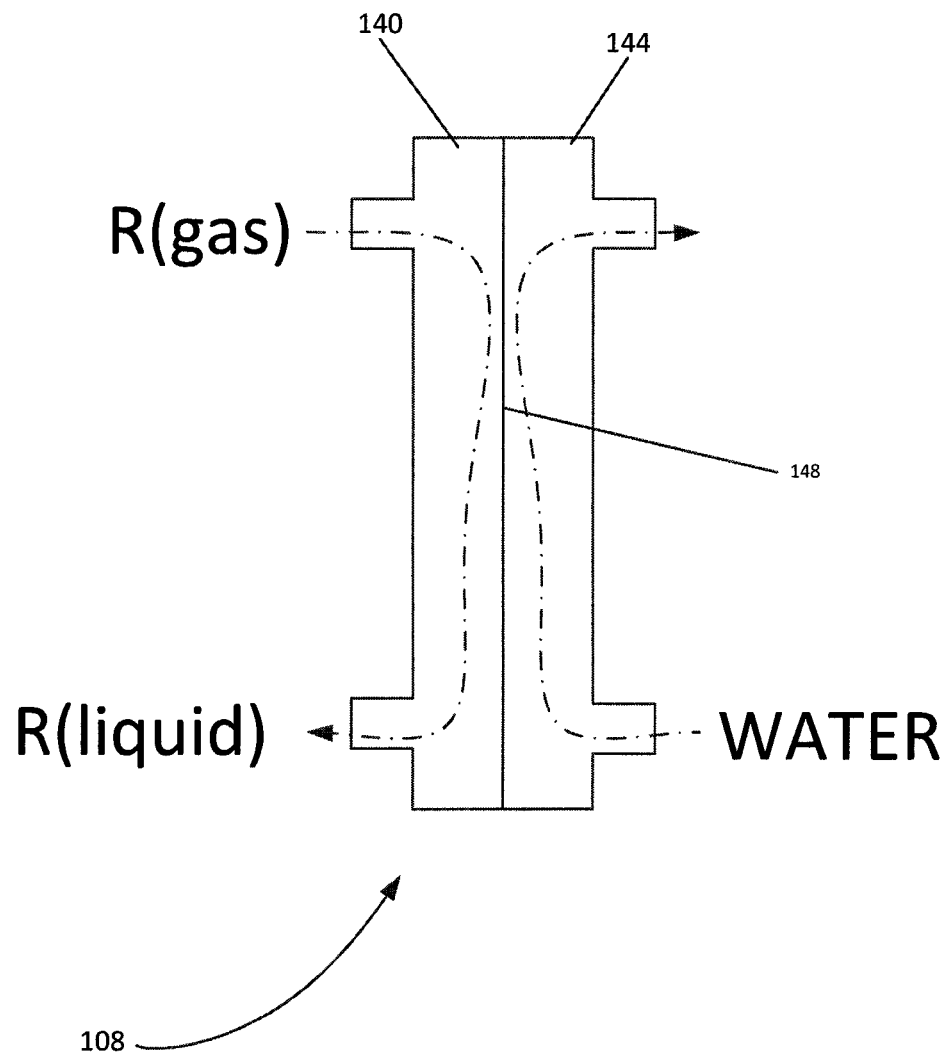
FIG. 5 is a schematic representation a condenser in accordance with an embodiment.

In the present embodiment, piping is used to combine the partially heated water portions from the first subcooler 100 and the second subcooler 104 and subsequently direct the water to the first condenser 108. The first condenser 108 is further configured to transfer more heat energy to the partially heated from the first subcooler 100 and the second subcooler 104. The manner by which heat energy is transferred is not particularly limited. For example, in the present embodiment, the first condenser 108 can include a first compartment 140 into which gaseous refrigerant enters and a second compartment 144 through which the water flows as shown in FIG. 5. It is to be appreciated, with the benefit of this description, that the lower temperature of the water relative to the gaseous refrigerant causes the refrigerant to condense on the wall 148, which is configured to transfer heat energy between the first compartment 140 and the second compartment 144. The rate at which heat energy is transferred is not particularly limited and can depend on several factors such as the material, size and geometry of the wall 148, as well as the relative temperatures of the two compartments 140, 144. Accordingly, this phase change releases heat energy from the refrigerant, which is transferred to the water to increase the temperature of the water.

The wall 148 is typically constructed from materials which can separate the two compartments while providing high thermal conductivity. Some examples of suitable materials include copper, stainless steel, aluminum, and other similar materials. The exact configuration of the two compartments 140, 144 is not particularly limited. In the present embodiment, the two compartments 140, 144 are configured such that the refrigerant and the water flow in opposite directions. In other embodiments, the configuration of two compartments 140, 144 can be configured such that the refrigerant and the water flow in the same direction. However, it is to be appreciated that since liquid refrigerant is collected, gravity can be used to collect the liquid refrigerant. In further embodiments, more compartments can be added to form alternating layers of refrigerant flow and water flow or a shell and tube type condenser can be used. The two compartments 140, 144 may also be configured to follow a tortuous route and may be provided with internal fins or other protrusions to increase heat transfer efficiency.

The second condenser 112 is in fluid communication with the first condenser 108 and is configured to receive the combined water flow after heat energy was by added the first condenser 108. The second condenser 112 is configured to transfer heat energy to the water similar to the first condenser 108 to further increase the temperature of the water. It is to be appreciated that the second condenser 112 is not particularly limited and can be similar or identical to the first condenser 108. It is to be re-emphasized that the present embodiment is a non-limiting embodiment and that the first condenser 108 and the second condenser 112 can be different from described. For example, the first condenser 108 and the second condenser 112 can be different sizes, from different manufacturers, of a different type, such as a shell and tube condenser.

It is to be appreciated, with the benefit of this description, that the water from the first subcooler 100 and the second subcooler 104 flows through the first condenser 108 and then the second condenser 112 in series. Accordingly each of the first condenser 108 and the second condenser 112, adds heat energy to the water to further increase the temperature of the water prior to delivering hot water to the tank 78. By adding heat energy to the water in steps, it is to be appreciated that the heat recovery system 62 can consume less energy than if the water were to be increased to the desired temperature in a single step.

In general terms, the heat recovery system 62 is generally configured to add heat energy to water from a water source 116 and deliver it to the tank 78. It is to be re-emphasized that the structure shown in FIGS. 3 to 5 is a non-limiting representation only. Notwithstanding the specific example, it is to be understood that other mechanically equivalent structures and heat transfer mechanisms can be devised to perform the same function as the heat recovery system 62. For example, the manner by which waste heat is collected is not particularly limited. In general, the refrigerant is configured to receive waste heat and transfer the waste heat to the water using various different system configurations which will be discussed in greater detail below.

Figure 6:
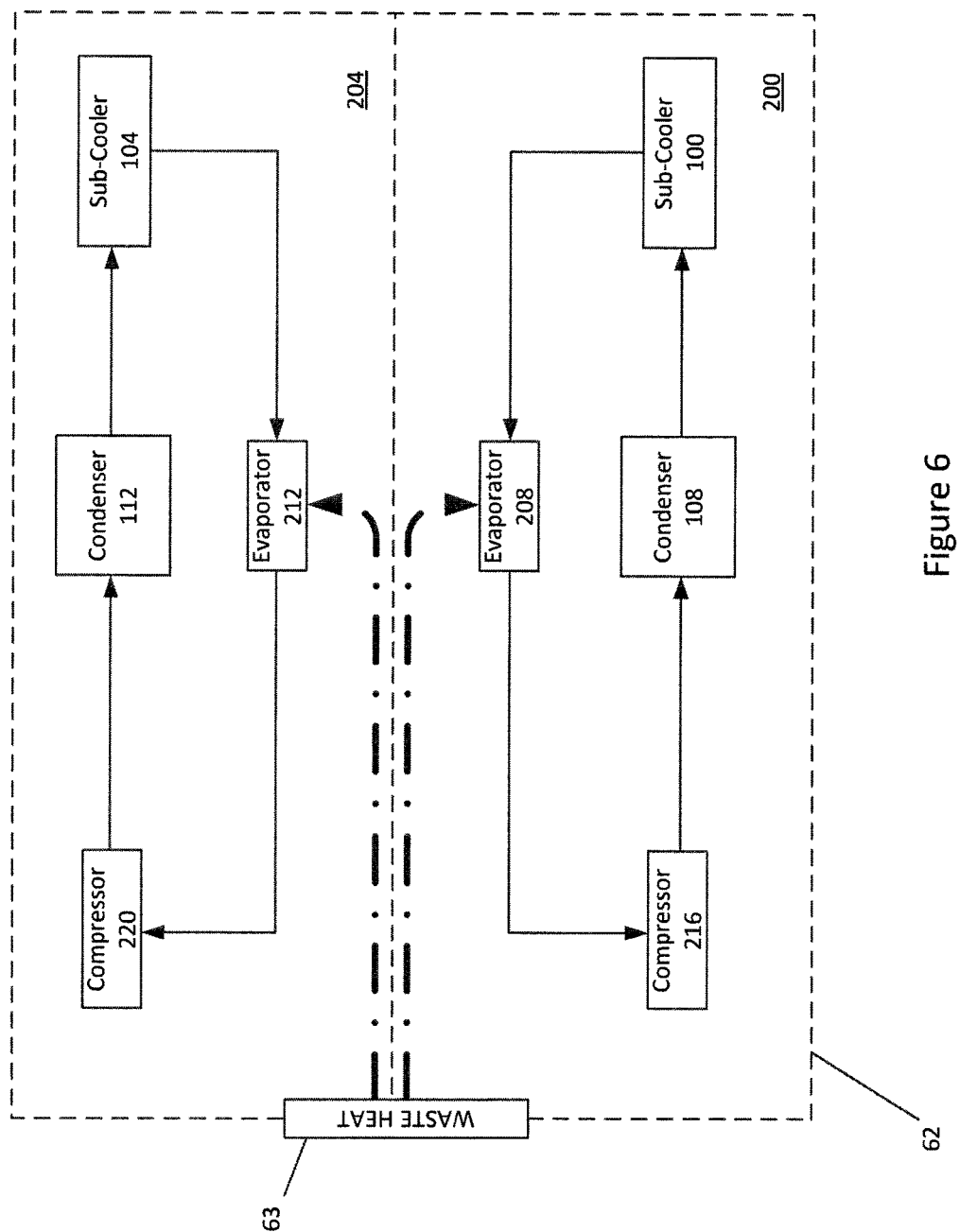
FIG. 6 is a schematic representation of refrigerant flow through the heat recovery system of the embodiment shown in FIG. 2.

Referring to FIG. 6, a schematic representation showing the flow of refrigerant through the embodiment of the heat recovery system 62 is shown in greater detail. It is to be re-emphasized that the heat recovery system 62 is purely exemplary and it will be apparent to those skilled in the art that a variety of configurations are contemplated including other embodiments discussed in greater detail below. In the present embodiment, the heat recovery system 62 includes a first refrigerant circuit 200 and a second refrigerant circuit 204. In the present embodiment, each of the first refrigerant circuit 200 and the second refrigerant circuit 204 is a closed circuit such that the amount of refrigerant in each of the first refrigerant circuit 200 and the second refrigerant circuit 204 is separated and does not leave or enter the first refrigerant circuit 200 and the second refrigerant circuit 204.

The first refrigerant circuit 200 includes the first subcooler 100, the first condenser 108, a first evaporator 208, and a first compressor 216. The first refrigerant circuit 200 is generally configured to transfer the waste heat to the water passing through the first subcooler 100 and the first condenser 108 using a refrigerant. The refrigerant used is not particularly limited. In the present embodiment, the refrigerant used in the first refrigerant circuit 200 is a haloalkane refrigerant such as R-134a. In other embodiments, the refrigerant can be substituted with another suitable refrigerant such as R-12, R-409A, or R-414A. As shown in FIG. 6, the refrigerant flows in a circuit from the first compressor 216 to the first condenser 108 to the first subcooler 100 to first evaporator 208 and back to the first compressor 216.

The first evaporator 208 is in thermal communication with the chiller system 54. The first evaporator 208 is not particularly limited and is generally configured to evaporate liquid refrigerant received from the first subcooler 100 into a gas. The heat energy required for the phase change is provided by the waste heat. The manner by which the waste heat is received by the first evaporator 208 is not particularly limited. In the present embodiment, the first evaporator 208 is disposed along the path by which the waste heat is transferred from the heat transfer unit 66 to the cooling tower 70. In the present embodiment, the first evaporator is disposed proximate to the source of the waste heat. Accordingly, the waste heat is received via thermal conduction across the waste heat connector 63. In another embodiment, an additional heat transfer mechanism (not shown) can be installed between the chiller system 54 and the heat recovery system 62 to transfer the waste heat to the heat recovery system 62. For example, a liquid with a high heat capacity can be used to absorb and transfer waste heat to the heat recovery system 62.

The first compressor 216 is generally configured to move the refrigerant through the first refrigerant circuit 200. In addition, the first compressor 216 is configured to compress the refrigerant into a hot, high-pressure refrigerant gas for delivery to the first condenser 108. It is to be understood that the first compressor 216 is not particularly limited. In the present embodiment, the first compressor 216 is a rotary screw compressor with a slider for capacity control. However, in other embodiments, the first compressor 216 can be a reciprocating compressor, a centrifugal compressor, or a scroll compressor with a variable-speed motor, a two-speed motor or unloaders for capacity control.

The second refrigerant circuit 204 includes the second subcooler 104, the second condenser 112, a second evaporator 212, and a second compressor 220. The second refrigerant circuit 204 is generally configured to transfer heat energy from the chiller system 54 to the water passing through the second subcooler 104 and the second condenser 112 using a refrigerant. The refrigerant used is not particularly limited and can be of the same type of refrigerant as used in the first refrigerant circuit. Alternatively, the refrigerant used in the second refrigerant circuit 204 can be a different. As shown in FIG. 6, the refrigerant flows in a circuit from the second compressor 220 to the second condenser 112 to the second subcooler 104 to second evaporator 212 and back to the first compressor 220.

The second evaporator 212 is in thermal communication with the chiller system 54 similar to the first evaporator 208. The second evaporator 212 is not particularly limited and is generally configured to evaporate liquid refrigerant received from the second subcooler 104 into a gas. It is to be appreciated that the second evaporator 212 is not particularly limited and can be similar or identical to the first evaporator 208. It is to be re-emphasized that the present embodiment is a non-limiting embodiment and that the first evaporator 208 and the second evaporator 212 can be different from described. For example, the first evaporator 208 and the second evaporator 212 can be different sizes, from different manufacturers, of a different type.

The second compressor 220 is generally configured to move the refrigerant through the second refrigerant circuit 204. In addition, the second compressor 220 is configured to compress the refrigerant into a hot, high-pressure refrigerant gas for delivery to the second condenser 112. It is to be understood that the second compressor 220 is not particularly limited. In the present embodiment, the second compressor 220 is a rotary screw compressor. However, in other embodiments, the second compressor 220 can be a reciprocating compressor, a centrifugal compressor, or a scroll compressor with a variable-speed motor, a two-speed motor or unloaders for capacity control. Furthermore, although the first compressor 216 and the second compressor 220 are identical in the present embodiment, it is to be understood that either one of the compressors 216, 220 can be a different type. In particular, since the parameters of the first refrigerant circuit 200 and the second refrigerant circuit 204 are different as discussed below, the first compressor 216 and the second compressor 220 can each be independently optimized for the first refrigerant circuit 200 and the second refrigerant circuit 204, respectively.

In transferring heat energy at the first condenser 108 and second condenser 112, the temperature of the water should be raised to the temperature at which the refrigerant undergoes the phase change giving off heat (condensation temperature). It is to be appreciated that since the water temperature in the two condensers 108, 112 are not equal to each other, the pressure to which the refrigerant in the first refrigerant circuit 200 and the second refrigerant circuit 204 must be compressed will not be equal. Since the temperature to which the water in the second condenser 112 is to be raised is higher, the pressure to which the refrigerant in the second refrigerant circuit 204 is raised is higher.

Figure 7:
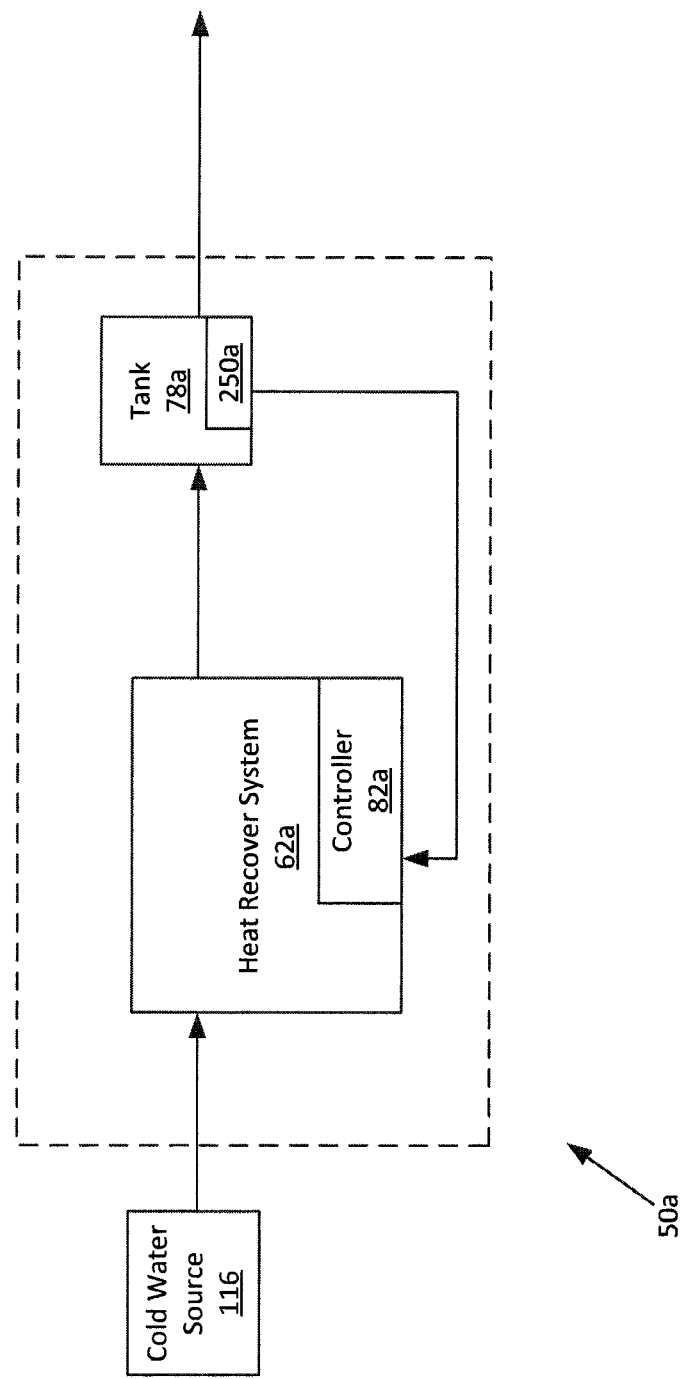
FIG. 7 is a schematic representation of an exemplary hot water system in accordance with another embodiment.

For example, referring to the embodiment shown in FIG. 7, the parameters of the hot water system 50a and the desired temperature of the hot water in the tank 78a determine the amount that the temperature of the water is to be raised, which ultimately determines the cumulative amount of heat energy that the heat recovery system 62a needs to add to the water. The water is generally flowing, a heat transfer rate would need to be determined based on the flow rate of the water. For example, if the cold water source 116 supplies water at about 25° C. and the tank 78a is configured to store water at a temperature of about 55° C., then sufficient heat energy is added to raise the temperature of the amount of water by about 30° C. As another example, if the tank 78a is configured to store water at a temperature of about 60° C., sufficient heat energy is added to raise the temperature of the amount of water by about 35° C. As another example, if the tank 78a is configured to store water at a temperature of about 65° C., sufficient heat energy is added to raise the temperature of the amount of water by about 40° C. It is to be appreciated that different applications can demand different temperatures of water and that some buildings can have a plurality of water tanks, each water tank maintaining the temperature of the water at a different temperature.

Referring back to FIG. 6, since the second refrigeration circuit requires greater compression, it is to be understood that the second compressor 220 compresses the refrigerant to a higher pressure than the first compressor 216. If both condensers were required to operate at the higher temperature required for delivery into the tank 78 (such as if the water flows in parallel through the condensers instead of in series), both the first compressor 216 and the second compressor 220 would need to operate the higher pressure. Accordingly, by providing a two step process, at two different condensation temperatures in condensers 108, 112, the heat recovery system 62, only the second compressor 220 compresses the refrigerant to a high pressure. Due to the lower pressure in condenser 108, it is to be appreciated, with the benefit of this description, that less power would be required by the first compressor 216 than the second compressor 220 resulting in further energy savings.

It is to be re-emphasized that the heat recovery system 62 described herein is a non-limiting representation only. For example, although the heat recovery system 62 includes two refrigerant circuits 200, 204 to conserve energy, it is to be understood that any number of refrigerant circuits can be used. For example, the heat recovery system can include a single refrigerant circuit to reduce costs associated with manufacturing a more complicated system. Alternatively, the heat recovery system can include three or more refrigerant circuits. Furthermore, it is also to be understood that the heat recovery system 62 is a heat pump configured to transfer waste heat from an external heat source, such as a chiller system using a refrigerant, the heat recovery system 62 can use other mechanisms to recover waste heat in other embodiments. For example, in other embodiments, thermal conduction can be used to transfer waste heat to heat the cold water from the source 116.

Referring back to FIG. 1, in the present embodiment, the controller 82 is configured to control the transfer of additional heat to the portion of the hot water using the heat recovery system 62. It is to be appreciated, with the benefit of this description, that the portion of hot water taken from the tank 78, further heated by the heat recovery system 62 and returned to the tank 78 can be used to maintain a steady state temperature of the hot water in the tank 78 within a predetermined range of temperatures. In particular, it is to be understood that by adding heat to the hot water in the tank 78 at a heat transfer rate about equal to the rate of natural heat loss from the tank 78 will maintain the temperature of the hot water in the tank 78. The manner by which the controller 82 controls the transfer of additional heat to the portion of the hot water is not particularly limited. For example, in the present embodiment, the controller can be configured to power on and power down the heat recovery system 62 from heating the portion of hot water from the tank periodically. In particular, the controller 82 can be configured to power on and to power down the heat recovery system 62 depending on a demand for hot water from the tank 78. It is to be appreciated that when the heat recovery system 62 is powered down from heating the portion of water, the portion of water merely flows through the heat recovery system 62 and back into the tank 78 without any heat added. In other embodiments, a valve can be used to control the flow of the portion of hot water. In further embodiments, various sensors can also be used to maintain the temperature of the water more precisely.

It is to be re-emphasized that the embodiment shown in FIG. 1 is purely exemplary and that variations are contemplated. For example, it is to be appreciated that although the controller 82 is shown to be part of the heat recovery system 62, the controller 82 can be a separate unit in other embodiments. For example, the controller 82 can be a computer with a processor running instructions stored on a memory. Furthermore, the controller need not be in the same room or even the same building if the controller 82 can communicate with the hot water system 50 using a network.

Referring back to FIG. 7, another embodiment of a hot water system for heating water from a source is shown generally at 50a. Like components of the hot water system 50a bear like reference to their counterparts in the hot water system 50, except followed by the suffix "a". The hot water system 50a includes a tank 78a, a heat recovery system 62a, a controller 82a, and a tank sensor 250a.

In the present embodiment, the hot water system 50a includes a tank sensor 250a for measuring the temperature of the hot water in the tank 78. The manner by which the tank sensor 250a measures the temperatures is not particularly limited and can include a wide variety of sensors such as a thermocouple, a resistance temperature detector (RTD), a thermistor, a thermostat, or infrared sensors. It is to be re-emphasized that the structure shown in FIG. 7 is purely exemplary and that variations are contemplated. For example, it is to be appreciated that although the tank sensor 250a is shown to be disposed in the tank 78a, the tank sensor 250a can be disposed elsewhere. For example, the tank sensor can be connected to the piping in fluid communication with the tank such that the tank sensor measures the temperature of the water before and/or after the water passes through the tank 78a. As another example, if the tank sensor 250a is a non-contact sensor such an infrared camera is used, the tank sensor 250a need not be in contact or fluid communication with the tank 78a.

The controller 82a functions in a similar manner as the controller 82 with the addition of being in communication with the tank sensor 250a. The controller 82a is generally configured to monitor the temperature of the hot water using measurements from the tank sensor 250a. In addition, the controller 82a is further configured to send signals to the heat recovery system 62a to add heat to a portion of the hot water when the temperature of the hot water in the tank 78 falls below the predetermined range of temperatures. The manner by which the controller 82a controls the transfer of additional heat to the portion of the hot water is not particularly limited and can include the manners discussed above in connection with the controller 82.

Figure 8:
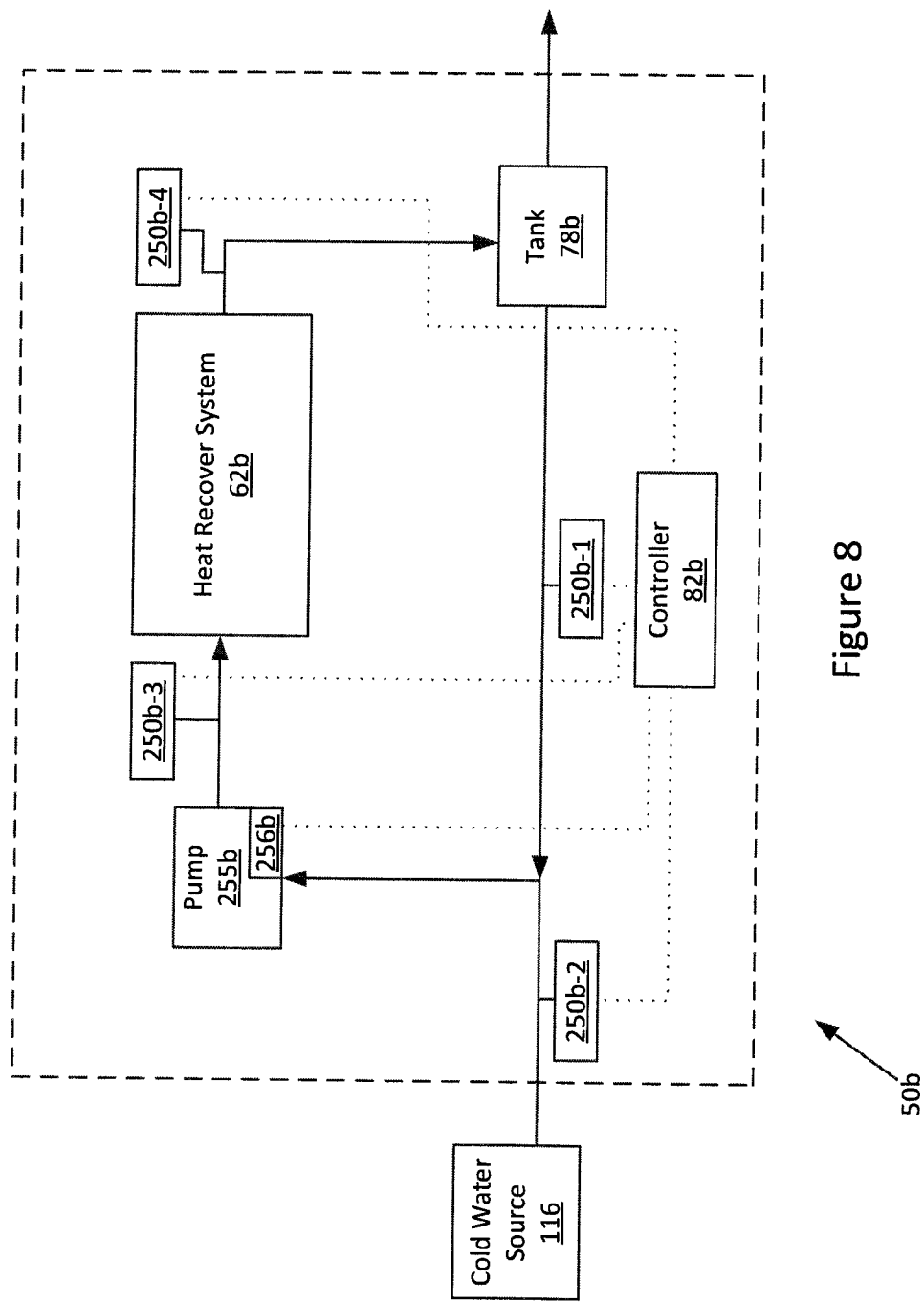
FIG. 8 is a schematic representation of an exemplary hot water system in accordance with another embodiment.

Referring to FIG. 8, another embodiment of a hot water system for heating water from a source is shown generally at 50b. Like components of the hot water system 50b bear like reference to their counterparts in the hot water system 50a, except followed by the suffix "b". The hot water system 50b includes a tank 78b, a heat recovery system 62b, a controller 82b, a plurality of sensors 250b-1, 250b-2, 250b-3, and 250b-4 and a pump 255b.

In the present embodiment, the hot water system 50b includes a plurality of sensors 250b-1, 250b-2, 250b-3, and 250b-4 for measuring the temperature at various locations in the hot water system 50b. The manner by which each of the sensors 250b-1, 250b-2, 250b-3, and 250b-4 measures the temperatures is not particularly limited and can include a wide variety of sensors such as those discussed above in connection with the tank sensor 250a. The sensor 250b-1 can carry out a similar function as the tank sensor 250a and measure the temperature of the hot water in the tank 78b as a portion of the hot water is drawn toward the pump 255b. In addition, the sensor 250b-1 can be used by the controller 82b to determine if the pump 255b is drawing enough water to prevent the cold water from the source 116 from directly entering the tank 78. The sensor 250b-2 can be used to measure the temperature of the cold water from the source 116. The measurement from sensor 250b-3 can be used to determine the amount of mixing of cold water and hot water. In particular, the measurement from sensor 250b-3 can be used by the controller 82b to adjust the ratio of hot water from the tank in order to maintain the temperature of the hot water in the tank 78b within the predetermined range of temperatures. The sensor 250b-4 can be used to determine the temperature of the water delivery to the tank 78b.

The hot water system 50b further includes the pump 255b for pumping a water flow to the heat recovery system 62b. The pump 255b is not particularly limited and can include any type of pump capable of pumping water. In the present embodiment, the pump 255b is connected to a motor which is power by a variable frequency drive 256b. The variable frequency drive 256b receives an input from controller 82b and varies the water flow rate through the pump 255b by adjusting the motor and the rotational speed of the pump 255b. It is to be appreciated, with the benefit of this description that other methods to vary the water flow rate to heat recovery system 62b can be used.

The pump 255b is generally configured to draw the water flow from at least one of the source 116 of cold water and the tank 78b. The demand for hot water from the hot water system 50b and the flow rate of cold water at source 116 into hot water system 50b are approximately equal and can vary throughout the day. In the present embodiment, the controller 82b uses the measurement from sensors 250b-1, 250b-2 and 250b-3 to operate the pump 255b such that all of the cold water from the source 116 goes through the pump 255b to the heat recovery system 62b. In other embodiments, the controller 82b may receive inputs from flow sensors (not shown) instead of, or in conjunction with, the measurement from the temperature sensors 250b-1, 250b-2 or 250b-3. It is to be appreciated that by drawing all of the cold water, the pump 255b effectively maintains the temperature of the hot water in the tank 78b by reducing or preventing the introduction of cold water directly into the tank 78.

It is to be understood by those skilled in the art that the efficiency of the heat recovery system 62b increases as the temperature of the cold water from the source 116 entering the heat recovery system 62b decreases. In particular, referring back to the heat recovery system 62 shown in FIG. 3, colder water at source 116 allows for more heat to be transferred in the first sub-cooler 100, second sub-cooler 104, first condenser 108 and second condenser 112. Furthermore, it is also to be understood, with the benefit of this description, that colder water at source 116 also allows for a decrease in the first compressor 216 and second compressor 220 energy consumption. Accordingly, both of these effects increase the efficiency of the heat recovery system 62. Referring back to FIG. 9, the heat recovery system 62b can be configured similarly to the heat recovery system 62 to exhibit similar characteristics described herein.

The cold water from the source 116 is generally colder than the water in tank 78b, therefore it is advantageous to have controller 82b operate the pump 255b to draw all of the cold water coming from the source 116 into the pump 255b and direct the cold water to the heat recovery system 62b. As described above, the pump 255b can draw a portion of hot water from the tank 78b in order to maintain the temperature of the hot water in the tank 78b within the predetermined range of temperatures. If the pump 255b is operated at a higher flow rate, the water entering the heat recovery system 62b will be higher than necessary, leading to a lower efficiency of the heat recovery system 62b. Conversely, if the pump 255b is operated at a lower flow rate than necessary the water in tank 78b will drop below the predetermined acceptable range of temperatures.

It is to be understood by those skilled in the art, with the benefit of this description, that domestic hot water systems like 50b generally have a peak demand which is several times higher than the average demand, for example the peak demand in hotels is very high in the morning when a large quantity of hot water is used for showering. Accordingly, heating systems are generally sized above the average demand but below the peak demand and the tank is generally sized to be a large enough thermal buffer cover the increase in demand.

The present embodiment allows for the flow capacity of the pump 255b and the heating capacity of the heat recovery system 62b to be sized smaller than the peak heating demand, while the flow rate of the cold water from source 116 is not limited by the pump 255b or the heat recovery system 62b. During times of peak demand the pump 255b is operated at maximum capacity however more cold water from the source 116 can enter the system 50b than is drawn into the pump 255b and a portion of the cold water can flow directly into the tank 78b without entering the heat recovery system 62b. Accordingly, the water temperature in tank 78b can drop as it acts as a thermal buffer when receiving direct cold water from the source 116. Once the demand for hot water is reduced and the flow rate of the cold water entering from the source 116 drops below the maximum capacity of the pump 255b, the controller 82b operates pump 255b to draw a portion of water from tank 78b increasing the temperature of water in tank 78b as described above. In other embodiments, a check valve can be used to prevent cold water from entering the tank 78b.

Figure 9:
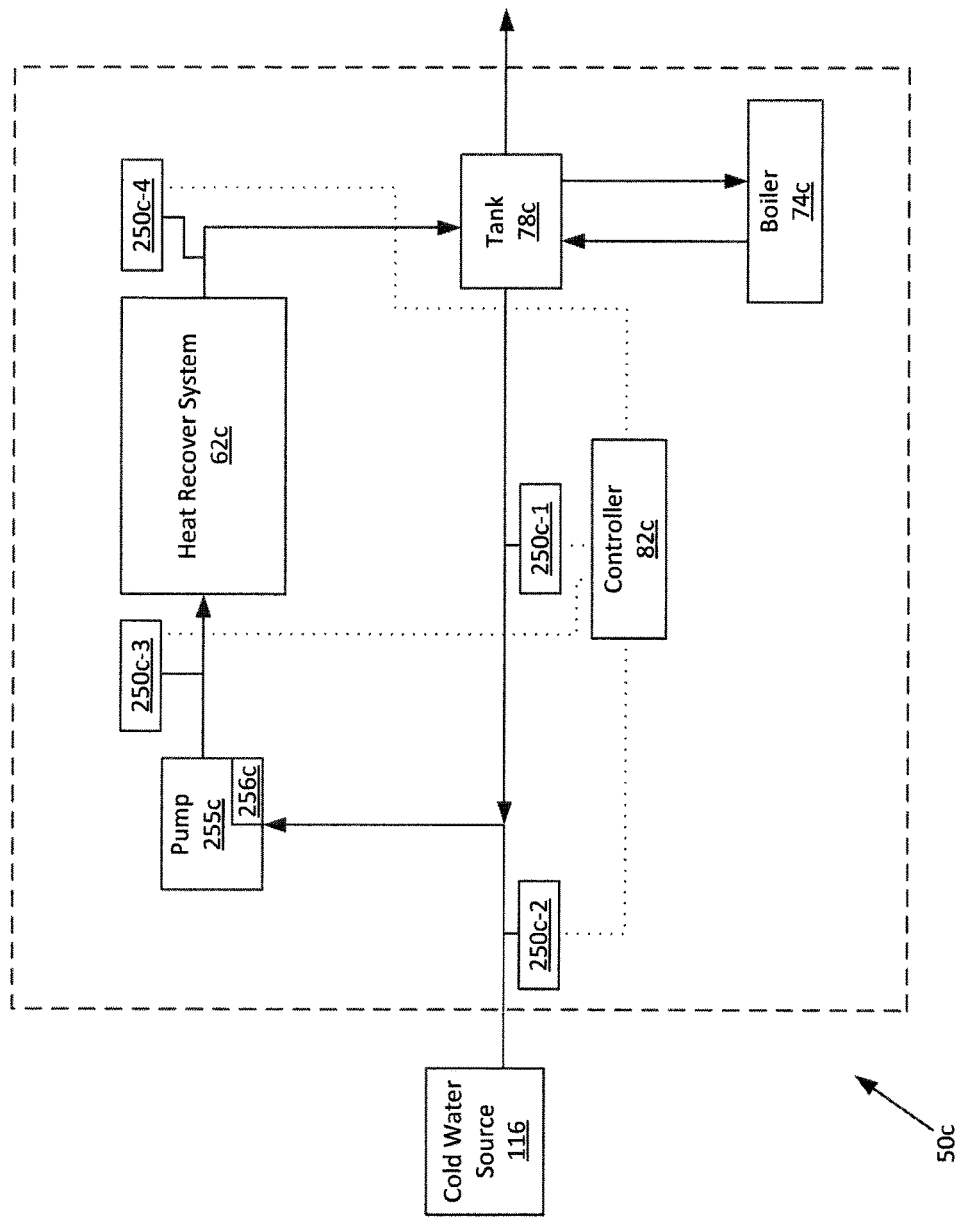
FIG. 9 is a schematic representation of an exemplary hot water system in accordance with another embodiment.

Referring to FIG. 9, another embodiment of a hot water system for heating water from a source is shown generally at 50c. Like components of the hot water system 50c bear like reference to their counterparts in the hot water system 50a, except followed by the suffix "c". The hot water system 50c includes a tank 78c, a heat recovery system 62c, a controller 82c, a plurality of sensors 250c-1, 250c-2, 250c-3, and 250c-4, a pump 255c, a variable frequency drive 256c, and a boiler 74c.

In the present embodiment, the hot water system 50c includes a boiler 74c for heating the hot water in the tank 78c. The manner by which the boiler 74c heats the hot water is not particularly limited. In general, the heat recovery system 62c supplies sufficient heat to provide the hot water. However, for occasions where the heat recovery system 62c cannot provide sufficient heating, such as during downtime or times of extreme demand for hot water, the boiler 74c can be used to supplement the heat added by the heat recovery system 62c.

Figure 10:
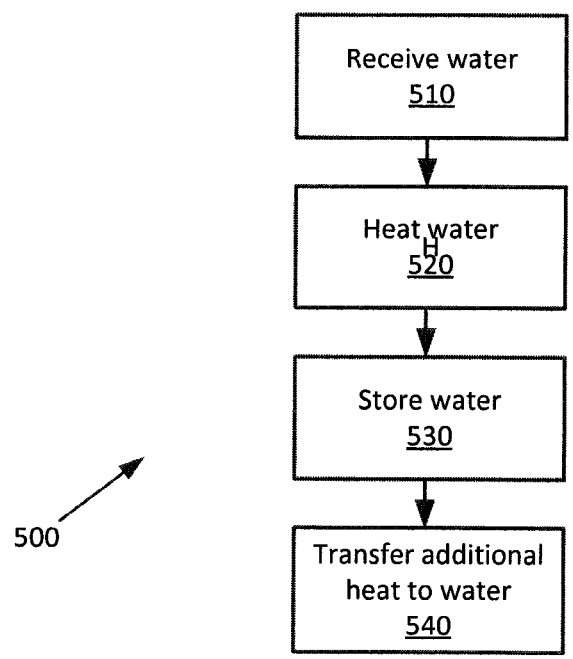
FIG. 10 is a flow-chart showing an exemplary method of operating the hot water system in accordance with the embodiment shown in FIG. 1.

Referring to FIG. 10, a method of operating a hot water system 50 is represented in the form of a flow-chart and indicated generally at 500. In the present embodiment, the method 500 can be implemented using the system 50. However, it is to be understood that the method 500 is not limited to the system 50 and can be implemented on a wide variety of systems. Furthermore, the following discussion of the method 500 will lead to further understanding of the system 50 and its various components. Although some blocks of the method 500 are indicated as occurring within certain components of the system 50, it is to be understood that the system 50 or the method 500 can be varied, and need not work as discussed herein in conjunction with each other. In addition, it is to be appreciated that the method 500 need not be performed in the exact sequence as shown, hence the elements of the method are referred to herein as "blocks" rather than "steps". For example, a person skilled in the art will appreciate with the benefit of these teachings that the order of some blocks can be interchanged and that some blocks can also be performed in parallel.

Beginning at block 510, the hot water system receives cold water from the source 116. The manner by which the cold water is received is not particularly limited and can include directing the cold water through piping generally used in plumbing in the building.

Block 520 comprises heating the cold water into hot water using a heat recovery system 62. The manners by which the heat recovery system 62 heats the water is not particularly limited and includes all the methods discussed above. In the present embodiment, an external water pressure is used to push the cold water through the components of the hot water system 50 where the cold water will be heated. Alternatively, in some embodiments, a pump is used to push the water through the hot water system.

Block 530 comprises storing the hot water in a tank 78 for future use. It is to be appreciated that the manner by which the hot water is stored is not particularly limited. In the present embodiment, the hot water is stored in an insulated tank.

Block 540 comprises transferring additional heat to a portion of the hot water for maintaining the hot water in the tank 78 at a temperature within a predetermined range of temperatures. The manner by which additional heat is transferred is not particularly limited and includes all the methods discussed above.

Figure 11:
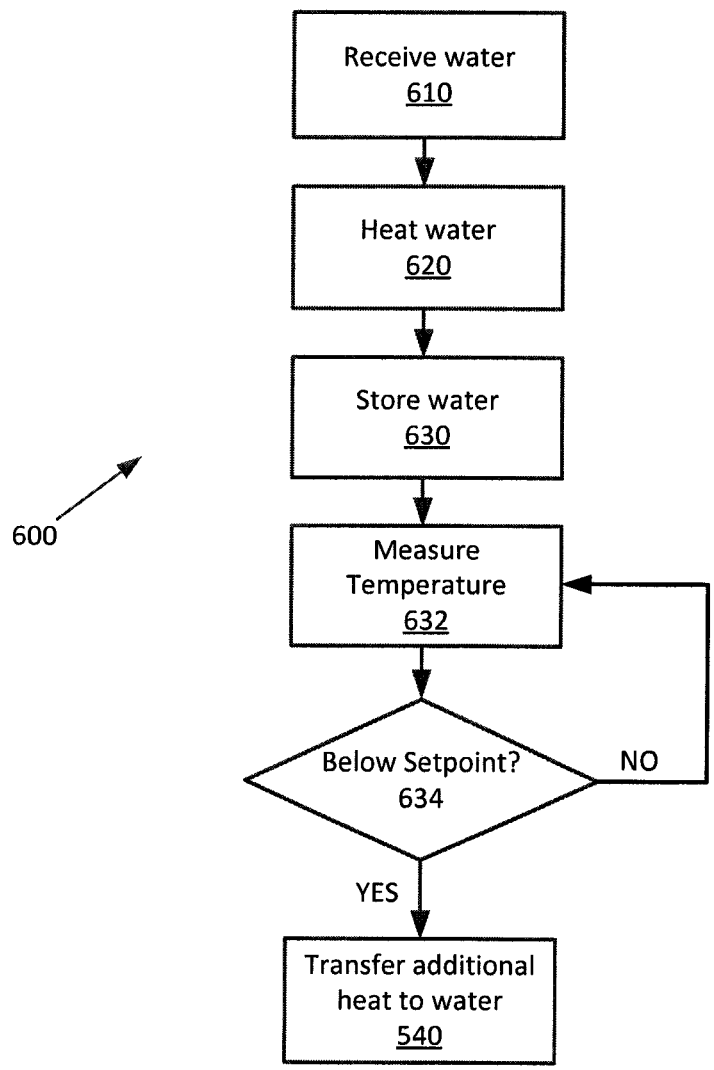
FIG. 11 is a flow-chart showing an exemplary method of operating the hot water system in accordance with the embodiment shown in FIG. 7.

Referring to FIG. 11, another method of operating a hot water system 50a is represented in the form of a flow-chart and indicated generally at 600. In the present embodiment, the method 600 can be implemented using the system 50a and can be considered a variation of the method 500 described above. However, it is to be understood that the method 600 is not limited to the system 50a and can be implemented on a wide variety of systems.

Beginning at block 610, the hot water system receives cold water from the source 116. The manner by which the cold water is received is not particularly limited and can include the manners discuss in connection with block 510.

Block 620 comprises heating the cold water into hot water using a heat recovery system 62a. The manner by which block 620 is performed is not limited and can include the manners discuss in connection with block 520.

Block 630 comprises storing the hot water in a tank 78a for future use. The manner by which block 630 is performed is not limited and can include the manners discuss in connection with block 530.

Block 632 comprises measuring a temperature of the hot water in the tank 78a with a tank sensor 250a. The manner by which the temperature is measured is not particularly limited and includes all the methods discussed above.

Block 634 comprises determining whether the temperature measured in block 632 falls below a predetermined range of temperatures. In the present embodiment, if the determination is affirmative, the method proceeds to block 640 which is performed in a similar manner as block 540. Alternatively, if the determination is negative, the method 600 would loop back to block 632 the measured temperature falls below a predetermined range of temperatures.

While specific embodiments have been described and illustrated, such embodiments should be considered illustrative only and should not serve to limit the accompanying claims.

What is claimed is:

1. A hot water system comprising:
    a tank configured to receive hot water, to store the hot water and to deliver a hot water flow upon demand;
    a heat recovery system in fluid communication with the tank and a source of cold water, the heat recovery system configured to receive cold water from the source and heat the cold water to provide the hot water to the tank, the heat recovery system further configured to heat a portion of the hot water;
    a pump for pumping a water flow from an external source to the heat recovery system;
    a sensor disposed on a line between the tank and the external source, the sensor for sensing a temperature of the water to detect a change in a direction of flow in the line based on a change in the temperature of the water; and
    a controller connected to the sensor and the pump, the controller configured to determine the direction of flow in the line based on the temperature from the sensor, and wherein the controller is configured to maintain the direction of flow across the sensor and prevent cold water from entering the tank directly by adjusting an operating capacity of the pump, the controller further configured to use the heat recovery system to transfer additional heat to the portion of the hot water, wherein the controller is configured to maintain the hot water in the tank at a temperature within a predetermined range of temperatures using the additional heat by adjusting the operating capacity of the pump.

2. The hot water system of claim 1, further comprising a tank sensor for measuring a temperature of the hot water in the tank.

3. The hot water system of claim 2, wherein the controller is configured to monitor the temperature of the hot water using the tank sensor and is further configured to heat the hot water when the temperature of the hot water falls below the predetermined range of temperatures.

4. The hot water system of claim 1, wherein the controller is configured to power on and to power down the heat recovery system depending on a demand for hot water in the tank.

5. The hot water system of claim 1, further comprising a boiler for heating the hot water in the tank.

6. The hot water system of claim 1, wherein the pump is configured to draw the water flow from at least one of the source and the tank.

7. The hot water system of claim 1, wherein the heat recovery system is a heat pump, the heat pump configured to transfer waste heat from an external heat source using a refrigerant.

8. The hot water system of claim 7, wherein the heat recovery system comprises: a condenser configured to receive a water flow, the condenser configured to transfer the additional heat to the water flow at a first heat transfer rate by condensing the refrigerant; an evaporator configured to receive the waste heat by evaporating the refrigerant; and a compressor for compressing the refrigerant.

9. The hot water system of claim 8, wherein the heat recovery system further comprises a subcooler configured to transfer more heat to the water flow at a second heat transfer rate by thermal conduction between the refrigerant and the water flow.

10. The hot water system of claim 9, further comprising a waste heat connector, the waste heat connector for connecting to the external heat source.

11. The hot water system of claim 10, wherein the waste heat connector is configured to connect to an existing chiller system.

12. The hot water system of claim 1, wherein the pump is powered by a variable frequency drive motor.

\* \* \* \* \*